United States Patent
Ishii et al.

(10) Patent No.: US 6,296,813 B1
(45) Date of Patent: Oct. 2, 2001

(54) EXHAUST EMISSION CONTROL CATALYST APPARATUS IN INTERNAL COMBUSTION ENGINE

(75) Inventors: Hitoshi Ishii; Kimiyoshi Nishizawa, both of Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/195,715

(22) Filed: Nov. 19, 1998

(30) Foreign Application Priority Data

Nov. 20, 1997 (JP) .................................... 9-319232
Oct. 19, 1998 (JP) ................................... 10-296880

(51) Int. Cl.$^7$ ........................ B01D 53/88; B01D 53/94; F01N 3/28
(52) U.S. Cl. ........................ 422/171; 422/177; 422/180
(58) Field of Search ................... 422/171, 177, 422/180; 60/297

(56) References Cited

U.S. PATENT DOCUMENTS 5,510,086 * 4/1996 Hemingway et al. ............ 422/171
5,772,972 * 6/1998 Hepburn et al. ................ 422/180

FOREIGN PATENT DOCUMENTS

661098 * 7/1995 (EP) .
5-59942 3/1993 (JP) .
8-224449 9/1996 (JP) .
8-284646 10/1996 (JP) .

* cited by examiner

Primary Examiner—Hien Tran
(74) Attorney, Agent, or Firm—Foley & Lardner

(57) ABSTRACT

An inner surface of a cell 12 of a honeycomb carrier 11 except a downstream end of the inner surface in the exhaust direction is coated with a HC (hydrocarbon) adsorption material 13. The inner surface of the cell 12 coated with the HC adsorption material 13 is coated with a three way catalytic converter layer 14. A portion X located upstream side of the exhaust flow and having the three way catalytic converter layer 14 on the HC adsorption material 13, and a three way catalytic converter layer portion Y located downstream side of the exhaust flow are formed on an inner surface of the cell 12 of the honeycomb carrier 11. With this feature, the HC repeats elimination, re-adsorption, elimination, re-adsorption, . . . from the portion of the HC adsorption catalyst 10 upstream of the exhaust flow, finally reaches the downstream end of the portion X including the three way catalytic converter layer 14 on the HC adsorption material 13. Since the downstream end of this portion X is provided with the three way catalytic converter layer portion Y, the HC is converted by the three way catalytic converter layer 14 of this portion Y.

1 Claim, 4 Drawing Sheets

EXHAUST EMISSION CONTROL CATALYST APPARATUS IN INTERNAL COMBUSTION ENGINE

BACKGROUND OF THE INVENTION

1. Field of the Invention

The present invention relates to an exhaust emission control catalyst apparatus in an internal combustion engine, and more particularly, to a technique for enhancing a conversion performance of HC (hydrocarbon) by a HC adsorption catalyst when it is cold.

2. Description of Related Art

Conventionally, there is a known exhaust emission control apparatus in which a HC (hydrocarbon) adsorption material is interposed in an exhaust passage of an internal combustion engine, the HC in exhaust is adsorbed by the HC adsorption material when it is cold, the HC is eliminated from the HC adsorption material after warming up of the engine, the eliminated HC is purified by three way catalytic converter or oxidizing catalyst disposed at the exhaust downstream of the HC adsorption material (see Japanese Patent Application Laid-open No. 5-59942 and the like).

That is, in this exhaust emission control apparatus, utilizing property of the HC adsorption material that the HC adsorption material adsorbs HC when temperature is low and eliminates HC when temperature rises to a fixed temperature, cold HC is adsorbed by the HC adsorption material, and when the exhaust temperature rises to the fixed value, the HC eliminated from the HC adsorption material is purified by the three way catalytic converter.

However, the exhaust emission control apparatus having the above described conventional HC adsorption material has the following problem.

That is, temperature rise of the HC adsorption material located upstream the exhaust passage is faster than that of the three way catalytic converter located downstream.

Therefore, when the elimination of the HC from the HC adsorption material is started, if a rear three way catalytic converter or oxidizing catalyst does not reach the activating temperature, there is an unfavorable possibility that the eliminated HC is not converted and is discharged, and discharge of the HC when it is cold can not be suppressed.

Further, another prior art includes the HC adsorption material upstream the exhaust passage, and exhaust emission catalyst for purifying the HC downstream the exhaust passage (Japanese Patent Application Laid-open No. 8-284646). In this prior art, by controlling heat capacity of the exhaust emission catalyst to a value smaller than heat capacity of the HC adsorption material, temperature rise of the exhaust emission catalyst located downstream is made faster than that of the HC adsorption material.

In this case, if the emission control catalyst can reach the activating temperature before the upstream end of the HC adsorption material which is most liable to receive the heat of the exhaust gas reaches the elimination temperature, it is possible to mostly purify the HC eliminated from the HC adsorption material. However, it is practically difficult to increase the difference in heat capacity to such an extent.

Another prior art is provided with HC adsorption catalyst in which a layer of catalyst for purifying HC is formed above a layer of HC adsorption material (Japanese Patent Application Laid-open No.8-224449). In this prior art, when the HC adsorbed by the HC adsorption material layer is eliminated, the HC passes the catalyst layer without fail, and temperature of the upper catalyst layer which directly contact with the exhaust gas rises faster than the lower HC adsorption material layer.

In this case, if the upper catalyst layer reaches the complete activating temperature when the lower HC adsorption material reaches the elimination temperature, it is possible to mostly purify the HC. However, since the HC elimination temperature of zeolite which is used as the HC adsorption material at the present is much lower than the activating temperature, when the HC adsorption material layer reaches the elimination temperature, the catalyst layer does not reach the complete activating state and therefore, it is not possible to purify all the eliminated HC by the catalyst layer.

In such a HC adsorption catalyst also, since the temperature rises from the upstream side which is most liable to receive heat of the exhaust gas, the elimination of the HC is started from the upstream side with the temperature rise. Among the eliminated HC, a portion thereof which is not purified by the catalyst layer is again adsorbed by the downstream side whose temperature has not risen yet and therefore, such HC should not be discharged to open air as it is. However, when a portion of the HC adsorption material layer in the vicinity of its downstream side also reaches the elimination temperature, the HC which is eliminated from the vicinity of the downstream side and which is not purified by the catalyst layer is discharged to open air as it is.

SUMMARY OF THE INVENTION

FIG. 1 shows a known HC adsorption catalyst arrangement wherein a three way catalytic converter layer 2 disposed on a HC adsorption material 1. This arrangement, however, suffers from the following problems.

That is, after the engine is started in a cold state, when the temperature of the HC adsorption catalyst is low, HC is adsorbed by the HC adsorption material 1 entirely, and when the warming up of the engine progresses and the exhaust temperature rises, the three way catalytic converter starts activating. The temperature of the three way catalytic converter layer 2 rises from a portion thereof located at upstream of exhaust flow, the elimination of HC which has been adsorbed by the HC adsorption material 1 is started, and among the HC which is once eliminated, a portion thereof which is not converted by the three way catalytic converter layer is again adsorbed by the rear portion of the HC adsorption material 1 where the temperature of the three way catalytic converter layer 2 is low. When the temperature of the three way catalytic converter layer 2 of this rear portion rises, the elimination of the HC which was again adsorbed by the HC adsorption material 1 is started, a portion of the HC is converted by the three way catalytic converter layer, and the remaining HC is again adsorbed by a further rear portion of the HC adsorption material 1 where the temperature of the three way catalytic converter layer 2 is low.

As described above, the HC repeats elimination, re-adsorption, elimination, re-adsorption, . . . on a portion of the HC adsorption catalyst downstream of the exhaust flow, and the HC finally reaches the downstream end of the HC adsorption catalyst and is discharged out and therefore, it is not possible to suppress the HC from being discharged when it is cold.

It is therefore an object of the present invention to provide an exhaust emission control catalyst apparatus in an internal combustion engine, in which a HC (hydrocarbon) adsorption catalyst having the three way catalytic converter coated on the HC adsorption material is used, and the conversion performance of the HC, when it is cold, is enhanced by improvement of the HC adsorption catalyst, and it is possible to effectively suppress the discharge of the HC.

To achieve the above problems, there is provided an exhaust emission control catalyst apparatus in an internal combustion engine, comprising:

a honeycomb carrier;

a hydrocarbon adsorption material layer disposed on an upstream side of the honeycomb carrier;

an upstream side three way catalytic converter layer disposed on the hydrocarbon adsorption material layer; and a downstream side three way catalytic converter layer disposed on a downstream side of the honeycomb carrier adjacent the hydrocarbon adsorption material layer.

Operations of the present invention will be explained.

After the engine is started in a cold state, when the temperature of the HC adsorption catalyst is low, HC is adsorbed by the HC adsorption material entirely, and when the warming up of the engine progresses and the exhaust temperature rises, the three way catalytic converter starts activating. The temperature of the three way catalytic converter layer rises from a portion thereof located at upstream of exhaust flow, the elimination of HC which has been adsorbed by the HC adsorption material is started, and the HC which is once eliminated is again adsorbed by the rear portion of the HC adsorption material where the temperature of the three way catalytic converter layer is low. When the temperature of the three way catalytic converter layer of this rear portion rises, the elimination of the HC which was adsorbed by the HC adsorption material is started, the eliminated HC is again adsorbed by a further rear portion of the HC adsorption material where the temperature of the three way catalytic converter layer is low.

As described above, the HC repeats elimination, re-adsorption, elimination, re-adsorption, . . . from the portion of the HC adsorption catalyst upstream of the exhaust flow, finally reaches the downstream end of the portion X including the three way catalytic converter layer on the HC adsorption material. Since the downstream end of this portion X is provided with the three way catalytic converter layer Y, the HC is converted by the three way catalytic converter layer of this portion Y.

Since the most downstream side three way catalytic converter layer is not formed at its lower layer with the HC adsorption material layer, the exhaust gas heat can be used for the temperature rise of the catalyst composition only. Therefore, it is possible to obtain activity state better than the upstream three way catalytic converter layer formed on the HC adsorption material layer.

The three way catalytic converter layer which is not formed at its lower layer with the HC adsorption material layer need not be in an excellent activity state when the upstream end of the HC adsorption material layer reaches the elimination temperature, and such a portion suffices if it is in the excellent activity state when the downstream end portion of the HC adsorption material layer reaches the elimination temperature. Further, the amount of HC which should be converted by this three way catalytic converter layer is very small, the increase amount of catalyst composition which must be carried due to the provision of the three way catalytic converter layer is also small.

According to the present invention, the HC which could not be converted by a portion of the HC adsorption material provided thereon with the three way catalytic converter layer can effectively be converted by the three way catalytic converter layer just downstream of the portion, and it is possible to suppress the discharge of the HC when it is cold.

In a preferred embodiment, the downstream side three way catalytic converter layer may be formed by extending the upstream side three way catalytic converter layer on the hydrocarbon adsorption material to a position extended in a further downstream direction from a downstream end of the hydrocarbon adsorption material.

With this configuration, the three way catalytic converter layer can easily be formed by merely extending the three way catalytic converter layer on the HC adsorption material.

Further, the downstream side three way catalytic converter layer may be formed by providing an independent three way catalytic converter layer on a position close to a downstream end of the upstream side three way catalytic converter layer on the hydrocarbon adsorption material.

With this configuration, the three way catalytic converter layer can easily be formed by adding the independent three way catalytic converter layer on the position close to the downstream end portion of the HC adsorption material provided thereon with the three way catalytic converter layer.

Further, the downstream side three way catalytic converter layer may comprise a high carrier three way catalytic converter layer carrying catalyst at a density higher than that of the upstream side three way catalytic converter layer on the hydrocarbon adsorption material.

With this configuration, it is possible to obtain the high HC conversion performance while suppressing the costs.

Furthermore, the downstream side three way catalytic converter layer is coated with a high carrier three way catalytic converter layer carrying catalyst at a density higher than the downstream side three way catalytic converter layer.

With these configuration, the conversion performance of the HC of the three way catalytic converter layer is enhanced. Further, the three way catalytic converter layer can easily be formed by the high carrier three way catalytic converter layer.

Furthermore, the honeycomb carrier may include an upstream side honeycomb carrier and a downstream honeycomb carrier, the upstream side honeycomb carrier and the downstream side honeycomb carrier are adjacently disposed, the hydrocarbon adsorption material layer and the upstream side three way catalytic converter layer are disposed on the upstream side honeycomb carrier, and the downstream side three way catalytic converter layer is disposed on the downstream side honeycomb carrier.

Moreover, the downstream side three way catalytic converter layer may carry catalyst of a density higher than that of the upstream side three way catalytic converter layer.

Further, the wall thickness of the downstream side honeycomb carrier may be formed thinner than that of the upstream side honeycomb carrier.

DETAILED DESCRIPTION OF THE PREFERRED EMBODIMENTS

The present invention will be explained in detail below with reference to the accompanying drawings.

Figure 1:
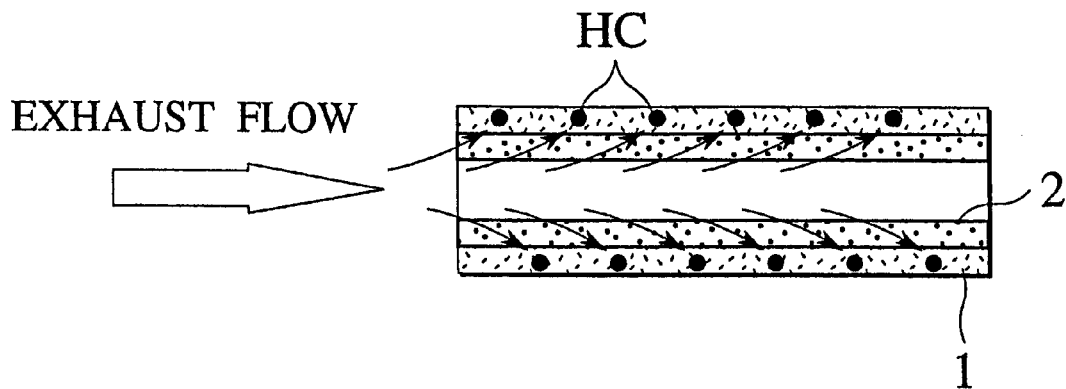
FIG. 1 is a sectional view of the HC adsorption catalyst arrangement discussed supra showing the direction of exhaust as flow in one cell thereof.
Figure 2:
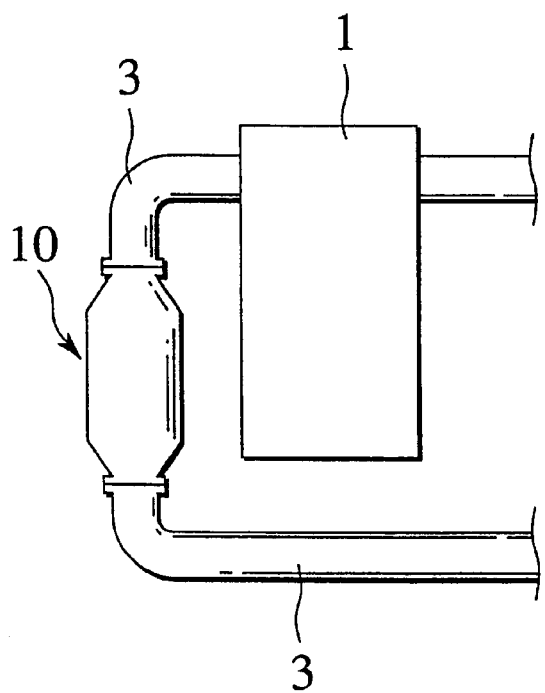
FIG. 2 is an arrangement plan view showing an embodiment of the exhaust emission control catalyst apparatus according to the present invention.

FIG.2 is an arrangement plan view showing HC (hydrocarbon) adsorption catalyst of an embodiment of the exhaust emission control catalyst apparatus according to the present invention. As shown in FIG.2, an exhaust passage 3 is extended from an engine 1, and is provided at its intermediate portion with a HC adsorption catalyst 10.

Figure 3:
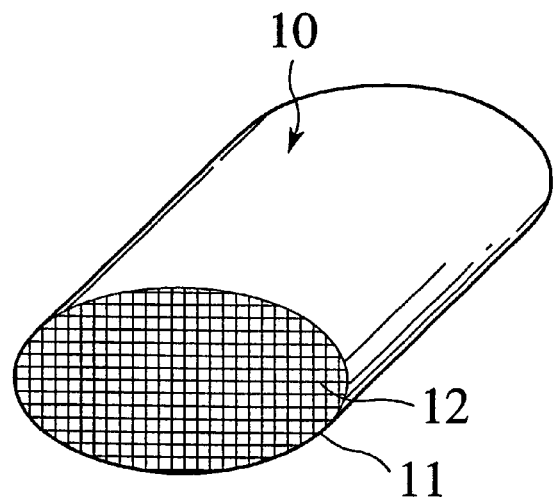
FIG. 3 is a perspective view showing the entire structure of the HC adsorption catalyst.

FIG.3 is a perspective view showing the entire structure of the HC adsorption catalyst apparatus of the embodiment of the exhaust emission control catalyst apparatus 10 of the invention, and each cell 12 of a honeycomb carrier 11 is coated with a catalyst layer.

Figure 4:
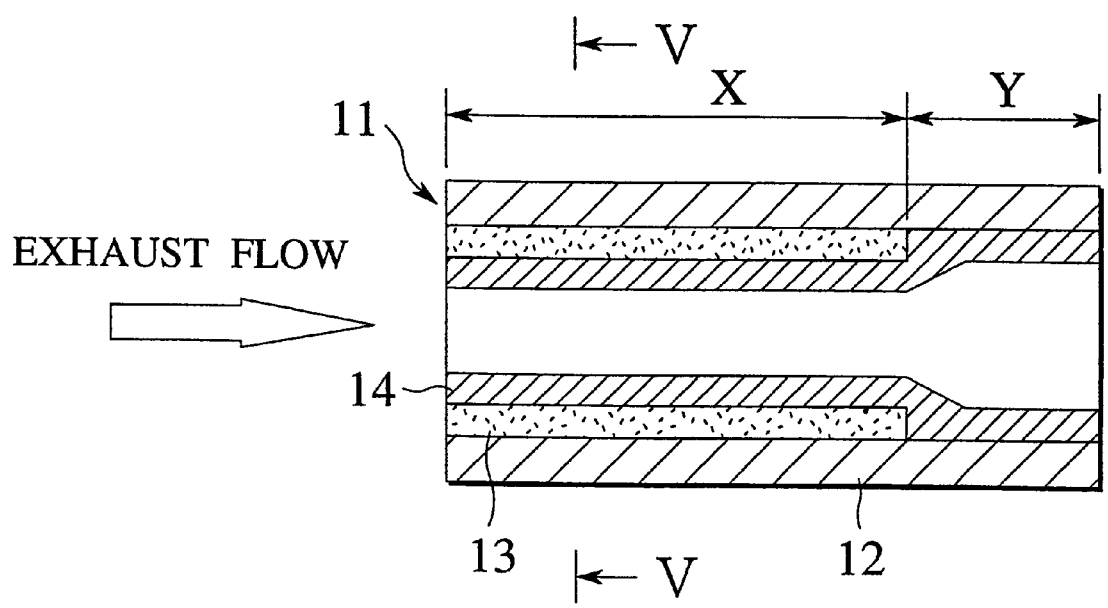
FIG. 4 is a sectional view of a HC adsorption catalyst along a direction of exhaust flow of one cell, showing a structure of the HC adsorption catalyst of the embodiment of the exhaust emission control catalyst apparatus of the present invention.
Figure 5:
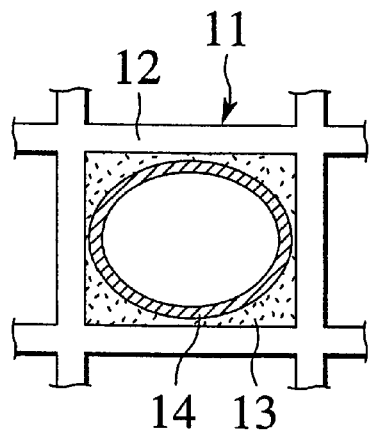
FIG. 5 is a sectional view along a direction perpendicular to the direction of exhaust flow of one cell, taken along the line V—V in FIG.4.

FIGS.4 and 5 show a structure of the catalyst layer of the cell 12 of the honeycomb carrier 11, wherein FIG.4 is a sectional view along a direction of exhaust flow of the cell 12, and FIG.5 is a sectional view along a direction perpendicular to the direction of exhaust flow of the cell 12, taken along the line V—V in FIG.4.

In these drawings, an inner surface of the cell 12 of the honeycomb carrier 11 is coated with HC adsorption material 13 such as zeolite except a downstream end of the inner surface in the exhaust flow direction, and the entire inner surface of the cell 12 coated with the HC adsorption material 13 is coated with three way catalytic converter layer 14 such as palladium, rhodium as precious metal catalyst.

By such a coating method of the HC adsorption material 13 and the three way catalytic converter layer 14, the three way catalytic converter layer 14 is extended beyond downstream and a portion X located upstream side of the exhaust flow and having the three way catalytic converter layer 14 on the HC adsorption material 13, and a three way catalytic converter layer portion Y located downstream side of the exhaust flow are formed on an inner surface of the cell 12 of the honeycomb carrier 11.

Next, an operation of the HC adsorption catalyst 10 of such a structure will be explained.

After cold start of the engine, when the temperature of the HC adsorption catalyst 10 is low, the HC is adsorbed by the entire HC adsorption material 13. When the warming up of the engine is continued and the exhaust temperature rises, the three way catalytic converter layer 14 starts activating. The temperature of the three way catalytic converter layer 14 rises from its portion located upstream of the exhaust flow, the elimination of the HC adsorbed by the HC adsorption material 13 is started, a portion of the HC which was once eliminated is converted by the three way catalytic converter layer 14, and the remaining HC is again adsorbed by the rear flow portion of the three way catalytic converter layer 14, which is the HC adsorption material 13 whose temperature is low. When the temperature of the rear portion of the three way catalytic converter layer 14 rises, the HC which was adsorbed by the HC adsorption material 13 starts to be eliminated, and similarly, the HC which was not converted by the three way catalytic converter layer 14 and was eliminated is again adsorbed by a further rear flow portion of the three way catalytic converter layer 14, which is the HC adsorption material 13 whose temperature is lower.

As described above, the HC repeats elimination, re-adsorption, elimination, re-adsorption, . . . from the portion of the HC adsorption catalyst 10 upstream of the exhaust flow, finally reaches the downstream end of the portion X including the three way catalytic converter layer 14 on the HC adsorption material 13. Since the downstream end of this portion X is provided with the three way catalytic converter layer portion Y, the HC is converted by the three way catalytic converter layer 14 of this portion Y.

Therefore, it is possible to suppress the HC from being discharged from the downstream end of the HC adsorption catalyst 10, and to suppress the HC from being discharged when it is cold.

A small amount of the three way catalytic converter layer portion Y suffices because the three way catalytic converter layer portion Y is only required to convert the HC in an amount which could not be converted by the three way catalytic converter layer 14.

Figure 6:
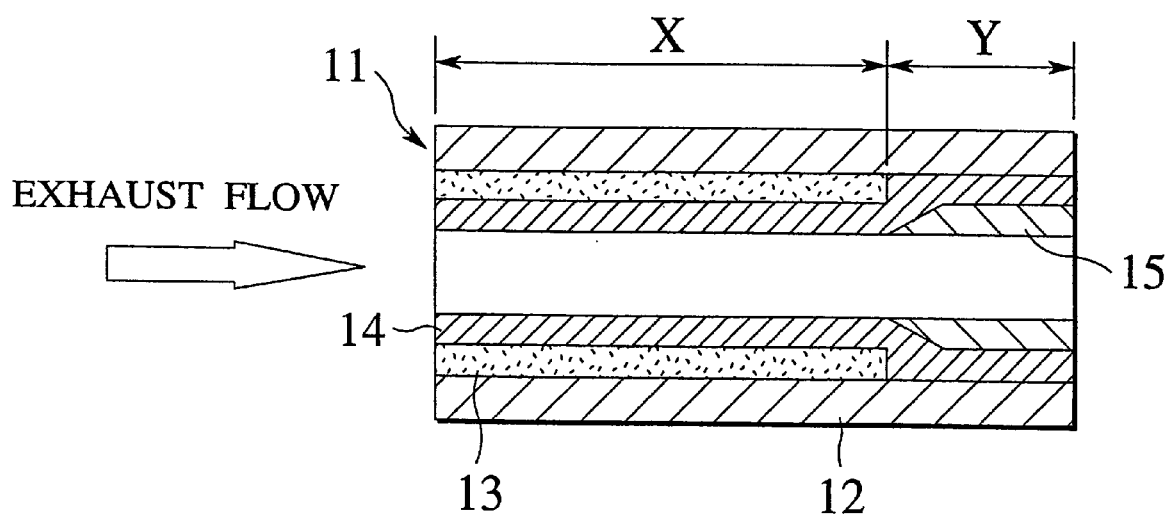
FIG. 6 is a sectional view of a HC adsorption catalyst along a direction of exhaust flow of one cell showing another embodiment.

It is preferable that the three way catalytic converter layer portion Y comprises a high carrier three way catalytic converter layer in which catalyst having density higher than that of the upper three way catalytic converter layer 14 of the HC adsorption material 13 is carried. In this case, as shown in FIG.6, a high carrier three way catalytic converter layer 15 in which catalyst having density higher than that of the upper three way catalytic converter layer 14 may be coated on the three way catalytic converter layer portion Y.

With this feature, it is possible to insure the high HC conversion performance while suppressing the costs.

Figure 7:
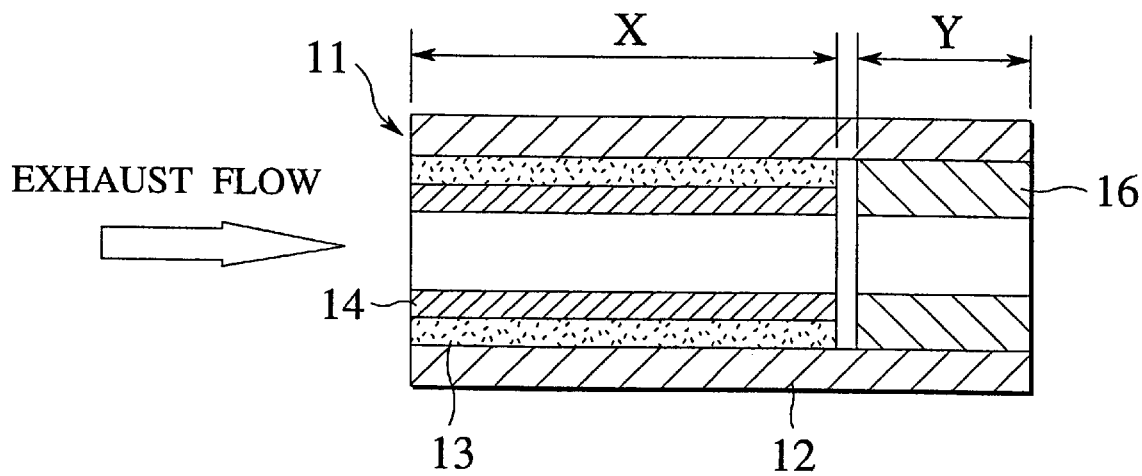
FIG. 7 is a sectional view of a HC adsorption catalyst along a direction of exhaust flow of one cell showing further another embodiment.

Although the three way catalytic converter layer portion Y is formed by extending the three way catalytic converter layer 14 of the HC adsorption material 13 up to the position extended further downstream from the downstream end of the HC adsorption material 13, as shown in FIG.7, the HC adsorption catalyst 10 may be formed by providing an independent three way catalytic converter layer 16 as the three way catalytic converter layer portion Y in a position close to the downstream end of the portion X including the three way catalytic converter layer 14 on the HC adsorption material 13.

In this case, the inner surface of the cell 12 is coated with the HC adsorption material 13 except its downstream end, and the three way catalytic converter layer 14 is coated on the HC adsorption material 13, and the three way catalytic converter layer 16 is coated on the downstream end of the inner surface of the cell 12.

Figure 8:
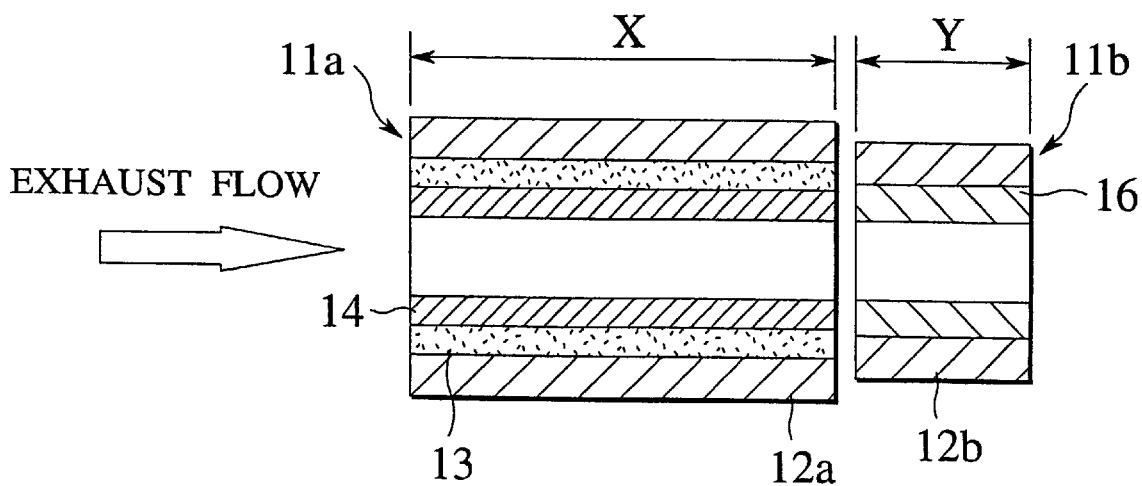
FIG. 8 is a sectional view of a HC adsorption catalyst along a direction of exhaust flow of one cell showing furthermore another embodiment.

In another embodiment shown in FIG. 8, an upstream side honeycomb carrier 11a and a downstream side honeycomb carrier 11b are divided. The portion X having the three way catalytic converter 14 on the HC adsorption material 13 of an upstream side cell 12a is coated, and the portion Y of a downstream side cell 12b having the three way catalytic converter layer 16 which has a density higher than that of the three way catalytic converter layer 14 which is coated on the upstream side cell 12a. The downstream side three way catalytic converter layer 16 is formed such that a surface area thereof (area contacted with exhaust gas) is large. A wall thickness of the downstream side honeycomb carrier 11b is formed thinner than that of the upstream side honeycomb carrier 11a, and a heat capacity of the downstream side honeycomb carrier 11b is set to a small value. With this arrangement, it is possible to further enhance the activation of the three way catalytic converter layer 16 when the downstream end portion of the HC adsorption material layer 13 reaches the elimination temperature.

What is claimed is:

1. An exhaust emission control catalyst apparatus for an internal combustion engine, comprising:

a honeycomb carrier having a plurality of cells through which exhaust, discharged from the internal combustion engine, flows;

a hydrocarbon adsorption material layer that is coated on the surface of each cell except a downstream end portion of the surface of each cell, the hydrocarbon adsorption material layer adsorbing hydrocarbon at a lower temperature and emitting hydrocarbon at a high temperature;

a first three way catalytic layer which converts hydrocarbon and which is coated on said hydrocarbon adsorption material layer and said downstream end portion of the surface of each cell; and a second three way catalytic layer that is coated on a portion of the first three way catalytic converter layer coated on said downstream end portion of the surface of each cell, the second three way catalytic layer converting hydrocarbon with higher efficiency than the first three way catalytic converter layer.

* * * * *